Nov. 23, 1965  E. R. ZIEGLER  3,219,779
MOTOR DRIVEN CAM ACTUATED SWITCH
Filed April 12, 1962  2 Sheets-Sheet 1

INVENTOR.
EUGENE R. ZIEGLER
BY
W. E. Finken
HIS ATTORNEY

Nov. 23, 1965 E. R. ZIEGLER 3,219,779
MOTOR DRIVEN CAM ACTUATED SWITCH
Filed April 12, 1962 2 Sheets-Sheet 2
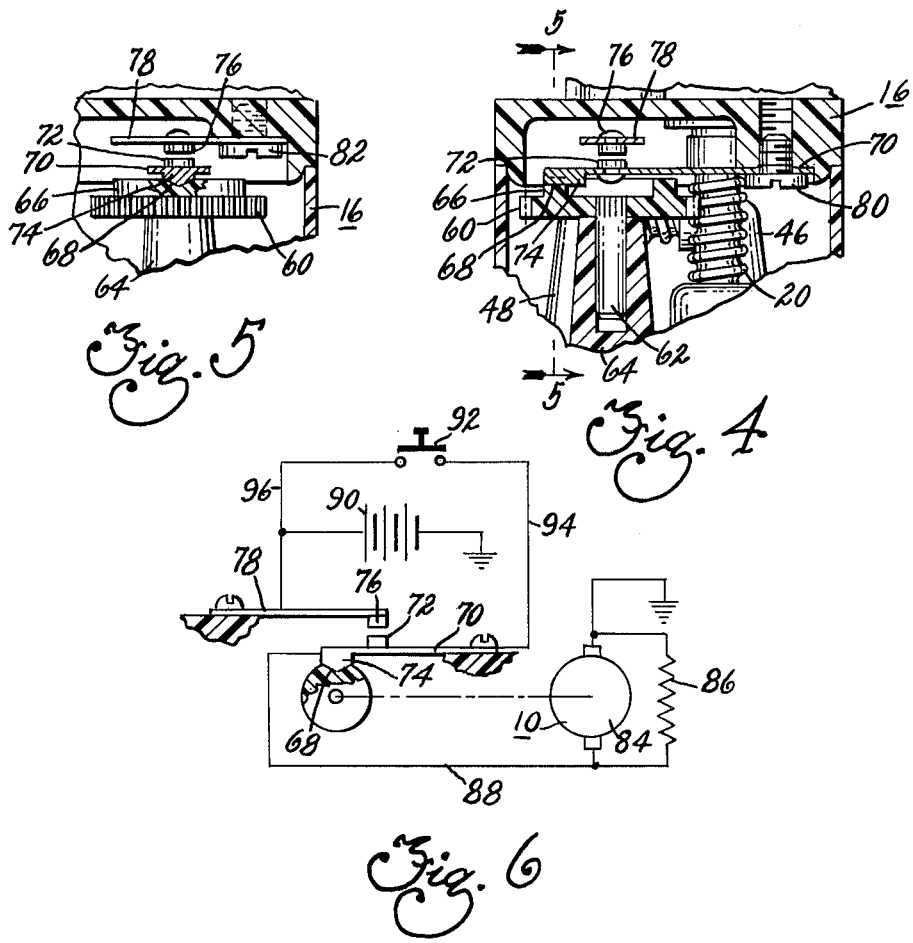
INVENTOR.
EUGENE R. ZIEGLER
BY
HIS ATTORNEY United States Patent Office 3,219,779
Patented Nov. 23, 1965

3,219,779
MOTOR DRIVEN CAM ACTUATED SWITCH
Eugene R. Ziegler, Spencerport, N.Y., assignor to General Motors Corporation, Detroit, Mich., a corporation of Delaware
Filed Apr. 12, 1962, Ser. No. 186,894
2 Claims. (Cl. 200—92)

This invention pertains to windshield cleaning apparatus, and particularly to a motor driven windshield washer pump embodying integral timing means for automatically arresting operation of the pump after a predetermined volume of liquid solvent has been delivered.

In my Patent #3,006,012, a windshield cleaning system is disclosed including an intermittent squirt-type pump driven by a separate motor, and wherein the washer pump motor operates a programming device for controlling conjoint operation of a wiper unit with the washer pump, and for automatically arresting the washer pump after a predetermined number of revolutions of the washer motor. The present invention relates to a simplified rotary-type washer pump which operates to deliver uniform, measured volumes of liquid solvent during each operation, and embodying an integral timer for continuing operation of the pump for a predetermined number of revolutions of the washer motor. The washer unit, of which the pump constitutes a component, may be coordinated with operation of an automatically operated wiper unit through a switch mechanism of the type shown in my Patent 2,905,962.

Accordingly, among my objects are the provision of an improved rotary windshield washer pump which delivers uniform, measured volumes of liquid solvent during each operation; the further provision of an electric motor operated gear-type washer pump embodying integral timer means for automatically arresting pump operation; and the still further provision of a windshield washer pump of the aforesaid type including a gear reduction operated timer for automatically deenergizing the pump motor after a predetermined number of revolutions thereof.

The aforementioned and other objects are accomplished in the present invention by embodying a cam actuated switch in the gear reduction unit for automatically deenergizing the pump motor after a predetermined number of revolutions thereof. Specifically, the improved washer pump assembly comprises a unidirectional direct current motor having an armature shaft connected directly to one of the pump gears. The armature shaft has a worm meshing with a worm wheel constituting a part of a gear reduction unit for the timer. The gear reduction unit includes a plurality of worms and worm wheels and a plurality of spur gears, the output spur gear of the gear reduction unit having a face cam for actuating a control switch. Sufficient reduction is effected by the gear reduction unit to deliver the requisite measured volume of liquid during each operation.

To initiate a cycle of washer pump operation, a manually operable push button switch is momentarily closed thereby shunting the timer operated switch to energize the pump motor. Thereafter, the timer switch remains closed for a complete revolution of the output spur gear, at which time the timer switch automatically opens to deenergize the motor and arrest washer pump operation. In a coordinated windshield cleaning system, manual operation of the push button washer switch mechanically operates the wiper switch so as to initiate operation of the wiper unit whereby the liquid solvent delivered by the washer pump will be sprayed onto predesignated areas of the windshield into the paths of movement of the wiper blades thereacross. When operation of the washer pump is automatically arrested by the timer, the wiper unit continues to operate until it is manually shut off.

Further objects and advantages of the present invention will be apparent from the following description, reference being had to the accompanying drawings, wherein a preferred embodiment of the present invention is clearly shown.

In the drawings:

FIGURE 4 is a fragmentary, sectional view taken along line 4—4 of FIGURE 3.

FIGURE 5 is a fragmentary view taken along line 5—5 of FIGURE 4.

FIGURE 6 is an electric schematic of the energizing circuit for the washer pump motor.

Figure 1:
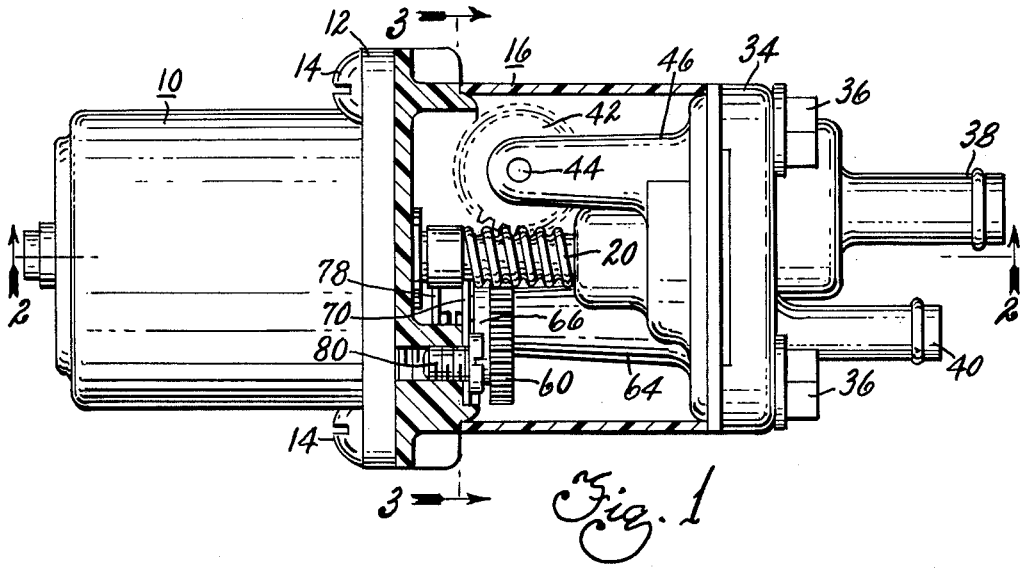
FIGURE 1 is a side view, partly in section and partly in elevation, of a windshield washer pump constructed according to the present invention.
Figure 2:
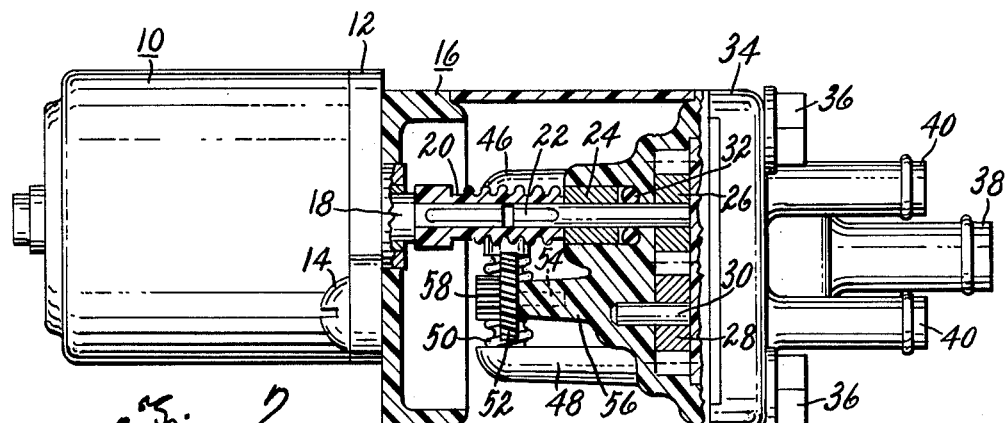
FIGURE 2 is a view, partly in section and partly in elevation, taken along line 2—2 of FIGURE 1.
Figure 3:
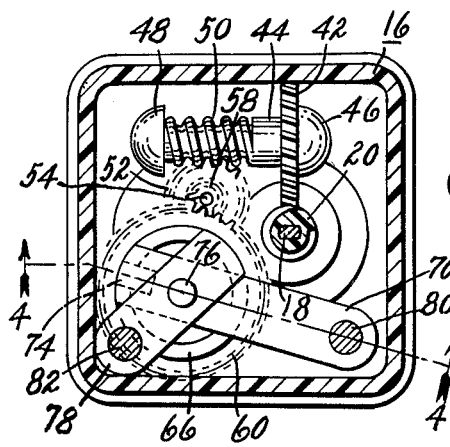
FIGURE 3 is a sectional view taken along line 3—3 of FIGURE 1.

With particular reference to FIGURES 1 through 5, the improved windshield washer pump comprises a unidirectional direct current motor 10 having a mounting flange 12 which is attached by screws 14 to a plastic pump multi-part housing 16. The several plastic parts of the housing 16 are suitably cemented together. The motor 10 includes an armature shaft 18 which is keyed to a coaxial worm 20, the worm 20 also being keyed to a pump gear shaft 22. The pump gear shaft is journalled by a sleeve bearing 24 in an integral boss in the pump housing 16, and is attached to a drive gear 26 of the positive displacement gear-type pump having a second gear 28. The gear 28 is mounted on a stub shaft 30 journalled in the housing 16. An O-ring seal 32 sealingly engages the pump gear shaft 22.

A valve housing 34 is attached to the pump housing by bolts 36, the valve housing 34 including an inlet nipple 38 and a pair of outlet nipples 40. In accordance with conventional practice in the windshield washer art, the valve housing 34 may include an inlet check valve and a pair of outlet check valves, it being understood that during rotation of the gears 26 and 28 liquid solvent is drawn from a reservoir, not shown, through the inlet nipple 38 and delivered under pressure to the outlet nipples 40.

As alluded to hereinbefore, the wash pump includes an integral timer so as to assure uniform delivery of measured volumes of liquid solvent during each operation. The timer controls the energizing circuit for the motor 10 after manual energization thereof, and automatically deenergizes the electric motor 10 when a measured volume of liquid solvent has been delivered. In order to accomplish this result, the motor 10 operates for a predetermined number of revolutions, and in the specifically disclosed embodiment, 1600 revolutions. A 1600 to 1 reduction is effected by the gear reduction unit comprising the worm 20 which meshes with a worm wheel 42. The worm wheel 42 is attached to a shaft 44 supported between bosses 46 and 48, the shaft 44 having an integral worm 50 thereon. The worm 50 meshes with a worm wheel 52 attached to a shaft 54 rotatably supported in a boss 56. The shaft 54 has a spur gear 58 attached thereto which meshes with an output spur gear 60 attached to a stub shaft 62 journalled in a boss 64.

The output spur gear 60 is formed with an integral axially projecting ring, or annulus, 66 having a V-shaped face notch 68 therein constituting a cam dwell. A leaf spring 70 carrying a contact 72 is inherently biased towards the gear 60, and has a follower 74 in engagement with the face of the annulus 66, which constitutes a cam rise. The contact 72 coacts with a stationary contact 76 attached to a leaf spring 78. The leaf spring 70 is attached to the pump housing by a terminal bolt 80, and the leaf spring 78 is attached to the pump housing by a terminal bolt 82. The contacts 72 and 76 are maintained in engagement as long as the follower 74 and the leaf spring 70 engage the face of the annulus 66. However, when the follower 74 engages the notch 68, the contacts 72 and 76 are separated as shown in FIGURES 4 and 5. It is to be understood that the output spur gear makes one revolution for each 1600 revolutions of the armature shaft 18, during which time a predetermined measured volume of liquid will be delivered through the nipples by the gear pump 26, 28.

Referring to FIGURE 6, the motor 10 is shown having an armature 84 and a shunt field winding 86, one terminal of the motor being grounded and the other terminal being connected to wire 88. The wire 88 is connected to the leaf spring 70 and hence to the contact 72. The contact 76 and its leaf spring 78 are shown connected to one terminal of the battery 90, the other terminal of which is grounded. The timer switch comprising contacts 72, 76 is shunted by manually operable push button switch 92 connected with the leaf springs 70 and 78 by wires 94 and 96, respectively.

Accordingly, it will be appreciated that upon momentary closure of the push button switch 92, the motor 10 will be energized and impart rotation to the pump gears 26, 28 and to the output spur gear 60. After a slight angular movement of the spur gear 60, the manual push button 92 can be released, since contacts 72 and 76 will be held in engagement to complete the energizing circuit of the motor 10. The motor 10 will then be controlled automatically by the timer switch comprising contacts 72, 76. After a complete revolution of the output spur gear 60, the cam dwell 68 will again be aligned with the follower 74 and thus cause separation of the contacts 72 and 76 to deenergize the motor 10. During rotation of the spur gear 60 throughout one complete revolution, a measured volume of liquid solvent, for instance two cubic inches, will be delivered by the positive displacement gear-type pump and discharged onto predesignated areas of the vehicle windshield through the usual nozzles.

While the embodiment of the invention as herein disclosed constitutes a preferred form, it is to be understood that other forms might be adopted.

What is claimed is as follows:

1. In combination, an electric motor having a rotary shaft, a gear reduction unit connected with said motor shaft including an output gear having an integral axially extending annulus, an automatic switch comprising a pair of leaf spring carried contacts inherently biased away from each other, and a cam formed on the face of the annulus of said output gear and operatively engageable with one of said leaf spring carried contacts for engaging and maintaining said leaf spring carried contacts in engagement in all but one angular position thereof, said cam permitting separation of said leaf spring carried contacts in said one angular position thereof.

2. In combination, an electric motor having a rotary shaft, a housing attached to said motor, a gear reduction unit connected with said motor shaft and disposed within said housing, said gear reduction unit including an output gear having an integral axially extending skirt with a cam rise and a cam dwell formed on the face thereof, an automatic switch comprising a pair of leaf springs supported in said housing and having superposed portions extending transversely of said skirt and carrying contacts, said leaf springs being inherently biased away from each other, a cam follower on the end of one of said leaf springs and biased into engagement with the face of said skirt whereby said automatic switch is closed when the cam follower engages said cam rise and open when said follower engages said cam dwell.

References Cited by the Examiner

UNITED STATES PATENTS

| 1,046,053 | 12/1912 | Bowser | 222—19 |
| 1,328,101 | 1/1920 | Pressler | 222—17 |
| 2,385,428 | 9/1945 | Tolliver | 222—17 |
| 2,550,942 | 5/1951 | Spangler | 103—25 |
| 2,677,030 | 4/1954 | Frey | 200—92 X |
| 2,786,175 | 3/1957 | Rohr | 318—466 |
| 2,788,482 | 4/1957 | Ray | 318—466 |
| 2,878,436 | 3/1959 | Mundt | 318—470 |
| 2,991,404 | 7/1961 | Griswold | 318—466 |
| 3,028,580 | 4/1962 | Durant | 200—92 X |
| 3,051,885 | 8/1962 | George | 318—467 |

FOREIGN PATENTS

| 963,857 | 1/1950 | France. |

BERNARD A. GILHEANY, *Primary Examiner.*

LAURINA V. EFNER, ORIS L. RADER, *Examiners.*